United States Patent
Baughman et al.

(10) Patent No.: US 10,097,568 B2
(45) Date of Patent: Oct. 9, 2018

(54) DNS TUNNELING PREVENTION

(71) Applicant: INTERNATIONAL BUSINESS MACHINES CORPORATION, Armonk, NY (US)

(72) Inventors: Aaron K. Baughman, Silver Spring, MD (US); Mauro Marzorati, Lutz, FL (US); Gregory A. Porpora, New Fairfield, CT (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 218 days.

(21) Appl. No.: 15/247,480

(22) Filed: Aug. 25, 2016

(65) Prior Publication Data

US 2018/0063162 A1  Mar. 1, 2018

(51) Int. Cl.
*H04L 29/06* (2006.01)
*G06F 21/55* (2013.01)

(52) U.S. Cl.
CPC ...... *H04L 63/1416* (2013.01); *H04L 63/1441* (2013.01); *G06F 21/55* (2013.01); *H04L 29/06911* (2013.01); *H04L 29/06925* (2013.01); *H04L 29/06931* (2013.01); *H04L 29/06938* (2013.01)

(58) Field of Classification Search
CPC ............ H04L 63/1416; H04L 63/1441; H04L 29/06938; H04L 29/06911; H04L 29/06925; H04L 29/06931; G06F 21/55
See application file for complete search history.

(56) References Cited

U.S. PATENT DOCUMENTS

| | | | | |
|---|---|---|---|---|
| 6,701,329 | B1* | 3/2004 | Esibov | H04L 29/12066 |
| 6,907,525 | B2* | 6/2005 | Pazi et al. | H04L 29/12066 709/225 |
| 7,970,939 | B1* | 6/2011 | Satish | H04L 29/12018 709/224 |
| 8,621,638 | B2* | 12/2013 | Judge | H04L 51/12 713/187 |
| 8,769,673 | B2* | 7/2014 | Williams | G06F 21/31 726/22 |
| 8,782,796 | B2 | 7/2014 | Hawthorn et al. | |
| 9,325,735 | B1* | 4/2016 | Xie | H04L 63/145 |

(Continued)

FOREIGN PATENT DOCUMENTS

| | | |
|---|---|---|
| CN | 103179100 A | 6/2013 |
| CN | 103326894 A | 9/2013 |

OTHER PUBLICATIONS

Davis et al., "Automated feature engineering for HTTP tunnel detection," Computers & Security, 59, 2016 (20 pages).

(Continued)

*Primary Examiner* — Izunna Okeke
*Assistant Examiner* — Shahriar Zarrineh
(74) *Attorney, Agent, or Firm* — Griffiths & Seaton PLLC

(57) ABSTRACT

Embodiments for domain name service (DNS) tunneling prevention by a processor. A DNS tunneling detection operation is requested to be performed upon receiving a DNS query. A response is generated based on the DNS tunneling detection operation such that the DNS tunneling detection operation indicates in the response that the DNS query for a domain name is associated with DNS tunneling activity.

12 Claims, 6 Drawing Sheets

(56) References Cited

U.S. PATENT DOCUMENTS

| | | | |
|---|---|---|---|
| 9,405,903 B1* | 8/2016 | Xie | G06F 21/56 |
| 9,560,072 B1* | 1/2017 | Xu | H04L 63/1416 |
| 2009/0157889 A1* | 6/2009 | Treuhaft | H04L 29/12066 |
| | | | 709/230 |
| 2013/0054802 A1* | 2/2013 | Donzis | G06F 17/30887 |
| | | | 709/225 |
| 2014/0059216 A1* | 2/2014 | Jerrim | H04L 67/104 |
| | | | 709/224 |
| 2015/0180892 A1* | 6/2015 | Balderas | H04L 63/1416 |
| | | | 726/11 |
| 2016/0026796 A1* | 1/2016 | Monrose | G06F 21/562 |
| | | | 726/24 |
| 2016/0036848 A1* | 2/2016 | Reddy | H04L 63/0227 |
| | | | 726/22 |
| 2016/0037581 A1 | 2/2016 | Maki | |
| 2016/0099852 A1 | 4/2016 | Cook et al. | |
| 2016/0127395 A1 | 5/2016 | Underwood et al. | |
| 2016/0366176 A1* | 12/2016 | Bennison | H04L 63/1441 |
| 2017/0222978 A1* | 8/2017 | Cathrow | H04L 63/0272 |

OTHER PUBLICATIONS

Erbacher et al., "Cognitive Task Analysis of Network Analysts and Managers for Network Situational Awareness," IS&T/SPIE Electronic Imaging, International Society for Optics and Photonics, vol. 7530, 2010 (12 pages).

\* cited by examiner

DNS TUNNELING PREVENTION

BACKGROUND OF THE INVENTION

Field of the Invention

The present invention relates in general to computing systems, and more particularly to, various embodiments for domain name service (DNS) tunneling prevention using a computing processor.

Description of the Related Art

In today's society, consumers, business persons, educators, and others use various computing network systems with increasing frequency in a variety of settings. A popular forum for worldwide data communication linking together computers on a global basis is the Internet. Generally, an Internet Web page's address or URL is made up of the name of the server along with the path to the file or the server. Rather than using a Web hosting service's server name as their URL, most companies and many individuals and other entities prefer a "domain name" of their own choosing. A domain name is a meaningful and easy-to-remember "handle" for an Internet address. The domain name system (DNS) is a name resolution protocol through which Internet domain names are located and translated into Internet Protocol addresses. DNS converts host names to IP addresses and vice-versa. Each domain is managed by a DNS name server, which is a server that contains the host name information about the hosts and subdomains within its domain.

However, in recent years, hackers have increasingly utilized the DNS network protocol as a medium for a covert channel. Communications that would otherwise be disallowed by network firewalls or other security monitoring systems may be able to readily pass through a network undetected as a DNS communication thereby compromising integrity and security.

SUMMARY OF THE INVENTION

Various embodiments for preventing domain name service (DNS) tunneling prevention by a processor are provided. In one embodiment, by way of example only, a method for preventing DNS tunneling prevention, again by a processor, is provided. A DNS tunneling detection operation is requested to be performed upon receiving a DNS query. A response is generated based on the DNS tunneling detection operation such that the DNS tunneling detection operation indicates in the response that the DNS query for a domain name is associated with DNS tunneling activity.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
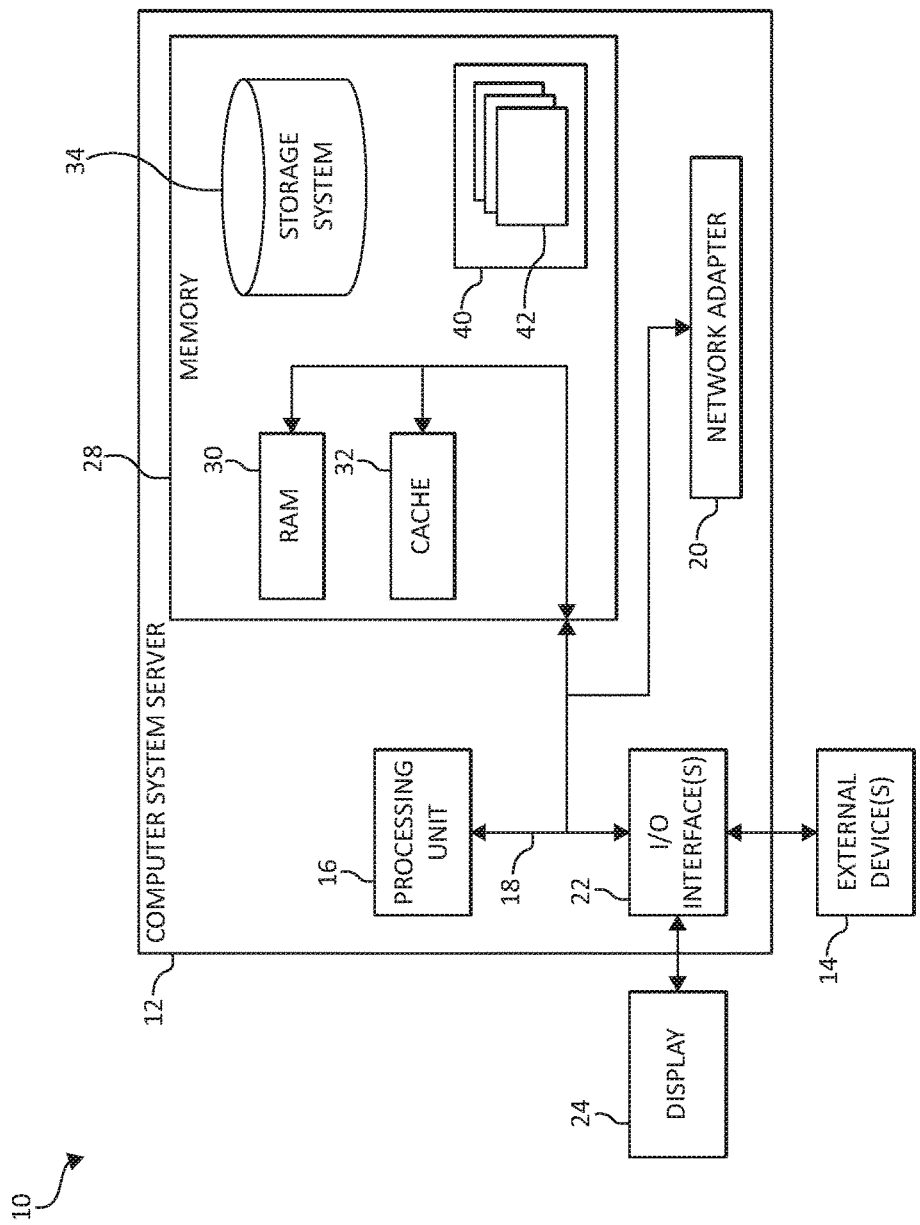
FIG. 1 is a block diagram depicting an exemplary cloud computing node according to an embodiment of the present invention.

As previously indicated, the Domain Name System (DNS) network protocol is being increasingly utilized by malicious actors as a medium for a covert channel. Communications that would otherwise be disallowed by network firewalls or other security monitoring systems may be able to readily pass through a network undetected as a DNS communication thereby compromising integrity and security. Further, the DNS protocol has significant room for user-defined data and supplementary text fields which may be utilized by a hacker to transmit covert information. Additionally, DNS servers are decentralized, making it easy to set up a DNS server that will function as the receiving end of covert DNS tunnels.

For example, a botnet may be a collection of compromised hosts, called bots. These bots are controlled by a bot master through a command and control (C&C) channel. Botnets can be classified as according to the underlying C&C communication protocol. The term botnet is also used to refer to a collection of compromised computers/devices (e.g., often referred to as zombie computers/devices, such as computers executing software). Botnets are usually installed via drive-by downloads exploiting web browser vulnerabilities, worms, Trojan horses, and/or backdoors, under a common C&C infrastructure. Malicious actors are currently subverting the DNS protocol to exchange information between a C&C bot master and its controlled hosts. Specially crafted DNS Queries are able to convey information to C&C collectors causing undetected exfiltration of information from corporate networks. In a similar fashion, specially crafted DNS resource records (RR's) are employed to distribute instructions and data to controlled machines.

Furthermore, these malicious actors execute DNS tunneling and exfiltration techniques by crafting unique subdomains and RR responses. Thus, a motivating factor for DNS tunneling by the malicious actor is to cause exfiltration of data from controlled networks. Accordingly, the present technology provides a cognitive method that can collect, analyze, classify and report where anomalous DNS traffic is being carried out using DNS tunneling detection operations to prevent the DNS tunneling activity and/or thwart the exfiltration of data via DNS tunneling methods.

In one aspect, the present technology provides for DNS tunneling prevention, again by a processor, is provided. A DNS tunneling detection operation is performed (or requested to be performed by a DNS tunneling detection processor) upon receiving a DNS query. A DNS tunneling detection operation may be performed and/or requested to be performed upon receiving a DNS query. A response is generated based on the DNS tunneling detection operation such that the DNS tunneling detection operation indicates in the response that the DNS query for a domain name is associated with DNS tunneling activity.

In one aspect, the present technology uses a DNS tunneling detection operation such that the DNS tunneling detection operation prohibits independent actors from defining their own protocol and implementing a purposely written client and host program to carry out arbitrary communications. In one aspect, the present technology leverages cognitive and contextual computing techniques to prevent DNS tunneling and/or identify and thwart exfiltration of data via these tunneling techniques. In one aspect, the present technology, using a DNS tunneling detection operation, may detect low-and-slow patterns present in beaconing and exfiltration activities, as well as C&C, and malware injection.

As mentioned, DNS tunnels can be used to exfiltrate data and provide command-and-control directives to initiate attacks. A first step of compromise is a beacon out to the command-and-control server to a) register the conquest and/or b) receive any action directives and/or c) exfiltrate collected data. A host may have been compromised at time prior to the installation of DNS tunnel prevention equipment. Exfiltration, and command/control messages could continue via other methods (sending exfiltrated data via email, accessing a special web page to get new instructions). Accordingly, the mechanisms of the present embodiments shut down the communication mechanism, irrelevant of the message contents, outside of bona fide DNS communications. Thus, the mechanisms of the present embodiments provide for prevention (or disruption) of DNS Tunneling.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
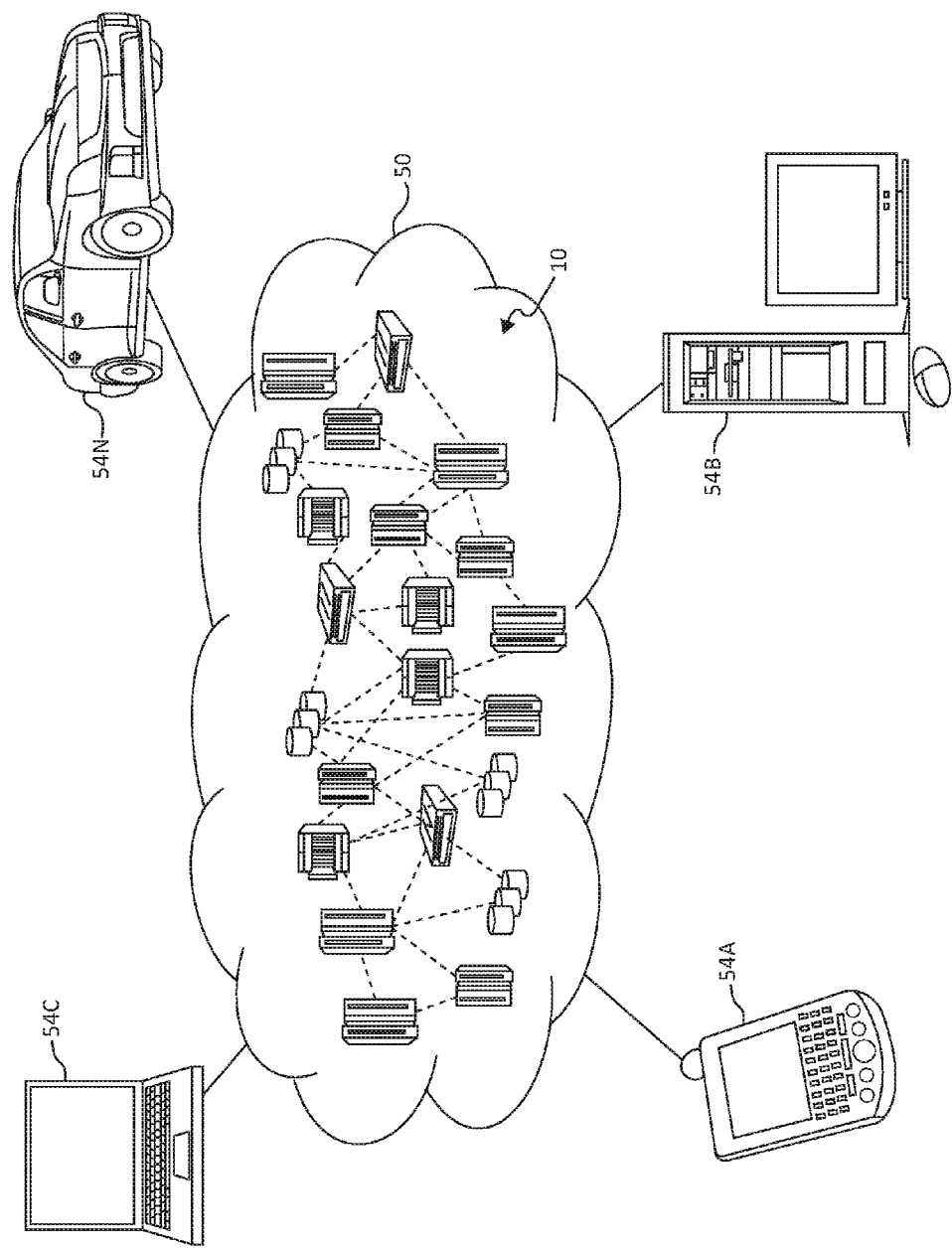
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
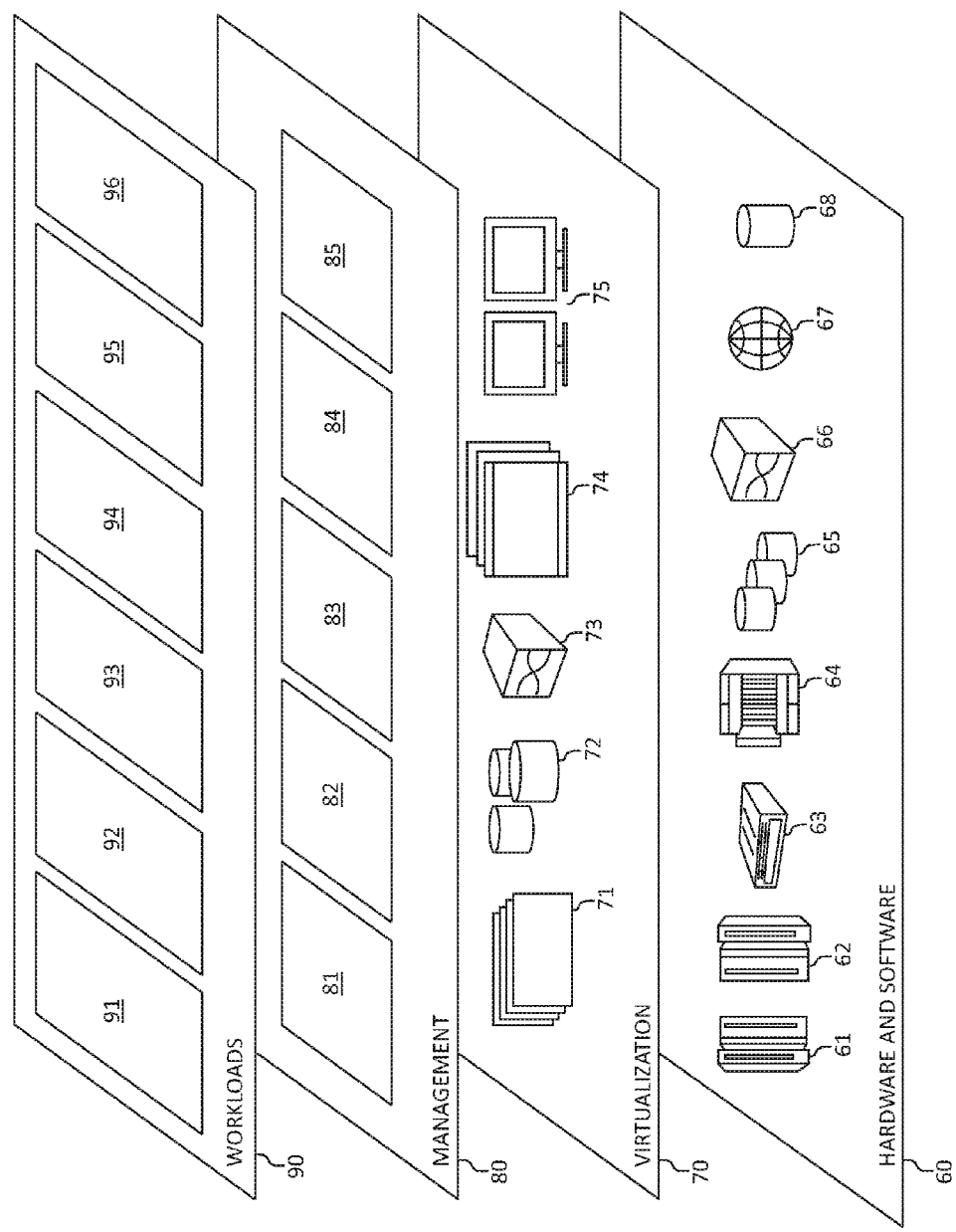
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various DNS tunneling prevention workloads and functions 95. In addition, DNS tunneling prevention workloads and functions 95 may include such operations as data prevention activity analytics, DNS protocol analysis, and as will be further described, user and device management functions. One of ordinary skill in the art will appreciate that the DNS tunneling prevention workloads and functions 95 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
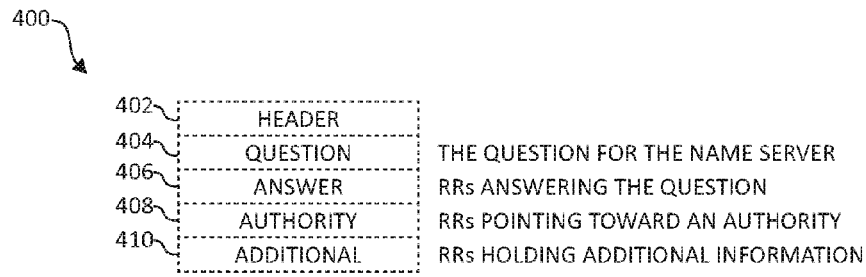
FIG. 4 is a diagram depicting a DNS message format in accordance with aspects of the present invention.

Turning now to FIG. 4, a block diagram depicting a DNS message format according to various mechanisms of the illustrated embodiments, is shown. In one aspect, communications inside of the DNS protocol may be carried in a single format called a message or "DNS message". A top level format of the message may be divided into 5 sections; a header 402, a question 404, an answer 406, an authority 408, and additional information 410. The question 404 may be the question for the name server. The answer 406 may be resource records answering the question 404. The authority 408 may be indicated via the resource records pointing towards an authority. The additional information 410 may include holding or containing any additional information.

In the depicted embodiment, the header 402 section may always present. The header 402 may include one or more fields that specify which of the remaining sections are present, and also specify whether the message is a query, a response, a standard query, and/or some other opcode, etc. The names of the sections after the header 402 may derive from their use in standard queries. In a similar fashion, the question 404 section may contain fields that describe a question to a name server. The fields may include, but not limited to, a query type (QTYPE), a query class (QCLASS), and a query domain name (QNAME). The last three sections (e.g., the answer 406, the authority 408, and the additional information 410) may have the same format: a potentially empty list of concatenated resource records (RRs).

In one aspect, the answer 406 section may contain RRs that answer the question 404. The authority 408 section may contain RRs that point toward an authoritative name server. The additional information 410 records section may contain RRs which relate to the query, but may not strictly provide answers 406 for the question 404. In one aspect, there are no restrictions to prevent an arbitrary number (e.g., up to a value of 65,535) of RR to be present in any of the answer 406, the authority 408, and the additional information 410 sections. Additionally, an arbitrary number (e.g., up to a value of 65,535) of queries may be sent as part of the query section. Each counter in the header 402 section may be a 16-bit unsigned integer.

It should be noted that DNS tunneling is a secondary result of a pre-infected host, and that a C&C host cannot just start tunneling into a targeted client. There must be tunneling software installed on the client to complete the connection which comes from malware. Once this malware has been installed it starts the process of establishing the DNS tunnel back to C&C host. As part of an initial communications, in the following example, (e.g., from an infected Client to C&C Host), the client sends a DNS Query, such as the DNS message describe in FIG. 4, that looks like it is transacting an e-mail sending functions that leverages the Sender Policy Framework (SPF) and its text (TXT) resource records (RR) within DNS. The payload can either be sent in the clear-plain text or encrypted Base 64.

Multiple objects may be requested in a single DNS transaction. Since the payload is in the query this allows for arbitrary lengths in the exfiltration payload. Additionally, since DNS response caching is done on the entire object, the uniqueness guarantees that the entire transaction will be transmitted to the Authoritative Domain Name Server (ADNS). For an initial response and subsequent communications, from the C&C Host to infected client perspective, orders may be transmitted to the infected clients via replies made to queries. Even as it is not possible for a DNS server to initiate communications to a client, it is possible for DNS servers to delay replies for a given amount of time. Consequently, if an infected client keeps making a request to a server the communication channel will remain open. This is called beaconing. It should also be noted that a transaction that mimics SPF, but in reality exfiltrates information to the authoritative DNS server in the domain, results in the responding answer being irrelevant because the information has already been exfiltrated since the query is necessarily forwarded to the ADNS. In this regard, the present invention a solution to ascertain whether the DNS question (DNS message) should even be asked prior to receiving an irrelevant responding answer where the information has already been exfiltrated by allowing a local DNS server or other entity to respond to the question portion of the DNS message rather than respond to the answer on the DNS message.

Thus, the mechanisms of the illustrated embodiments provide novel approaches for the prevention of DNS tunneling by, among other aspects, performing a DNS tunneling detection operation (or requesting a DNS tunneling detection processor perform the DNS tunneling operation) and generating a DNS tunneling detection response such that the DNS tunneling detection operation indicates in the DNS tunneling detection response (e.g., a response to the question portion of the DNS message rather than the answer portion) that the DNS query for a domain name is associated with DNS tunneling activity. In one embodiment, the tunneling detection response may provide a request or indicate a signal to perform a recursive DNS lookup request "upstream" to another DNS server until an ADNS server is located (e.g., an exfiltration collector server) to determine whether the DNS query is associated with the DNS tunneling activity. A value may be assigned to each one of a variety of factors. The factors may include an age of a domain name, a set of resource records, reputation data of the domain name, and detection of DNS tunneling activity (e.g., data exfiltration activity) using DNS tunneling. A DNS response score may be calculated according to the assigned values for generating the response. For example, each value may be summed together to equal the DNS response score.

In one aspect, the DNS tunneling detection operation may be performed on both sides of a DNS transaction, such as on the request side and the question side of the DNS message (e.g., DNS query and DNS answer). In one aspect, the DNS tunneling detection may include detection analytics and DNS tunneling deep learning. In one aspect, "deep learning model" may refer to classification models that may require longer training times in exchange for more accurate classifications. In some embodiments, deep learning neural network models may be considered a deep learning model. However, other machine learning and/or classification techniques may be employed to generate deep learning model.

In one aspect, the DNS tunneling detection operation may include checking a DNS request query domain name (QNAME) for unusual patterns (e.g., unknown or unusual), entropy or length where exfiltrated data may be embedded. The DNS may be check mail exchanger (MX) records, text (TXT) records, and the like for Base 64 encoding encryption. The length of TXT SPF RR may also be checked. The DNS tunneling detection operation may perform a data traffic analysis on a number of time requests made in a selected time period. The DNS tunneling detection operation may perform a data traffic frequency analysis of a number of non-recognizable (e.g., unknown or unusual) transmissions. The DNS tunneling detection operation may perform a data packet inspection for payload analysis of the QNAME and any other fields (e.g., answer, authority, additional).

In one aspect, DNS tunneling activity detection may include one or more input features that may come from the DNS messaging resource records. The resource records (RR) may be characterized into three classes of features that may be employed for the detection of the two types of DNS tunneling activity; 1) beaconing out and/or Exfiltration, and 2) beaconing in or Infiltration. The three broad classes may be: 1) communication based: internet protocol (IP) count, time to live (TTL), QType flag, IP Origin, name server (NS) IP addresses, 2) Payload Carrier based: TXT, CNAME, QNAME, QCLASS, and/or 3) state based: non-existent domain (NXDomain). Furthermore, additional key inputs may be received by a Maxmind Geo-IP database used to extract country of registration, time zone of registration, date of registration as additional DNS tunneling signifiers. The DNS tunneling may be detected for both outbound from infected host as well as inbound from Botnet C&C server. In one aspect, the DNS tunneling detection operation may operate on a request/question side. The DNS tunneling activity detection input feature may be extracted for each DNS session and inputted into the DNS tunneling detection heuristic and machine learning based models employed for detection and classification into one of three categories: 1) benign, 2) suspicious, and/or 3) malicious.

In one aspect, the DNS tunneling detection operation may perform a payload analysis of QNAME, CNAME, TXT and SPF Resources Records looking for patterns of messaging as well as malware instruction for open communications, supervised learning (SL) that break down into an ensemble of models for (Beaconing-Exfiltration specific, Infiltration Specific, reverse DNS Heuristics that looks for signifiers and lastly behavior Heuristics), each of which may employed and used in a Naïve Bayes learned model. Dynamic deep learning may be used to defeat slow changing or static defenses built on models or signatures that don't adapt. Each of these features may be used to retrain one or more machine learning models.

The DNS tunneling detection heuristic and machine learning based models may be performed using a wide variety of methods of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are considered to be within the scope of this disclosure.

As will be further described, other aspects of the mechanisms of the illustrated embodiments may include the DNS response score may be compared to a first level threshold. A non-existing domain may be provided in the DNS response to prevent the DNS tunneling and/or data exfiltration activity upon the DNS response score being greater than the first level threshold. The DNS response score may be compared to a second level threshold. A DNS server address may be provided in the DNS response upon the DNS response score being less than the second level threshold.

Figure 5:
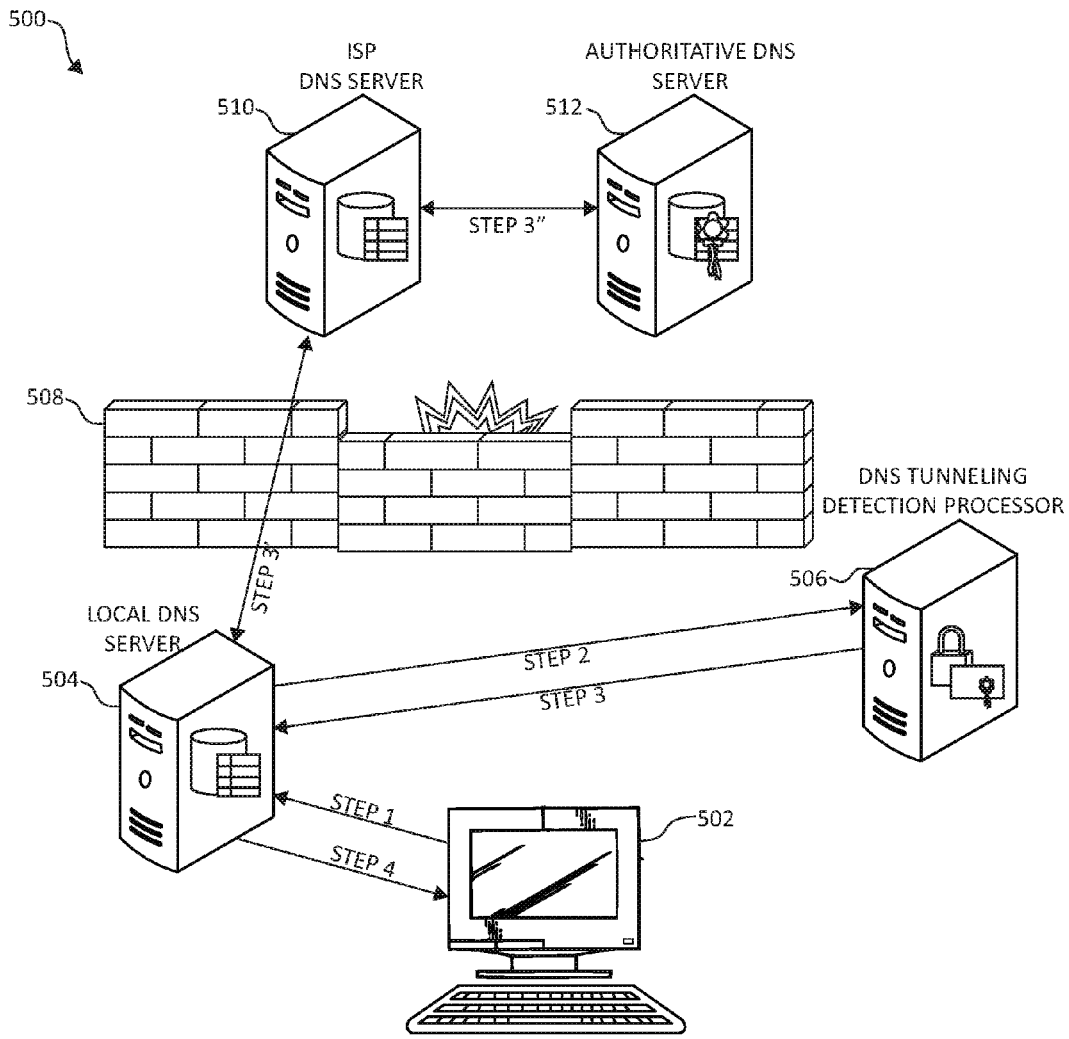
FIG. 5 is a block diagram depicting an exemplary functional relationship between various aspects of the present invention.

Turning now to FIG. 5, a block diagram depicting an exemplary functional relationship between various aspects of the present technology is depicted. In one aspect, each of the devices, components, modules, and/or functions described in FIGS. 1-4 may also apply to the devices, components, modules, and functions of FIG. 5. Also, one or more of the operations and steps of FIGS. 1-4 may also be included in one or more operations or actions of FIG. 5. For example, although not explicitly depicted in FIG. 5, one or more of the computer system/server 12 of FIG. 1, may incorporate processing unit 16 to perform various computational, data processing and other functionality in accordance with various aspects of the present technology. Furthermore, the devices, components, modules, and/or functions described in FIG. 5 may also contain communication connections or networking apparatus and networking connections that allow the devices to communicate with other devices.

In one aspect, FIG. 5 depicts the functional relationship between a user (e.g. a workstation) 502, a DNS server 504 (e.g., a local DNS server "LDNS"), a DNS tunneling detection processor 506 (or server), an IPS DNS server 510, and an authoritative DNS server 512 for preventing DNS tunneling. In one aspect, firewall 508 may be included as part of the functional relation between the user (e.g., a workstation) 502, the DNS server 504 (e.g., a local DNS server "LDNS"), the DNS tunneling detection processor 506 (or server), the IPS DNS server 510, and the authoritative DNS server 512. That is, FIG. 5 illustrates a four step process for preventing DNS tunneling. In one aspect, the user 502 sends a request to the LDNS 504 resolve a domain name which may be an exfiltration attempt, as in step 1. That is, a DNS query may be associated with a domain name associated with DNS tunneling thereby utilizing a DNS network protocol as a medium for a covert channel. The LDNS 504, using the DNS tunneling detection processor 506, may perform a DNS tunneling detection operation, as in step 2. The DNS tunneling detection processor 506 may provide a response to the LDNS 504 server that may return a non-existing domain (e.g. a fake answer "NXDomain") if the DNS query is not to be answered or may indicate or signal in the response to continue resolution of the DNS query "upstream" with other DNS servers, as in step 3. For example, the response to continue resolution of the DNS query "upstream" with other DNS servers may include providing in the response a request to perform a recursive DNS lookup request "upstream" to another DNS server until an ADNS server is located (e.g., an exfiltration collector server) to determine whether the DNS query is associated with the DNS tunneling or data exfiltration activity. If in step 3, the return response includes a non-existing domain and the DNS query is disallowed, step 4 may be performed. Step 4 includes the LDNS sends a response to the user 502 with either the non-existing domain (e.g., NXDomain) or an indication that an answer is not found or located.

Alternatively, if in step 3, the response includes a request to perform a recursive DNS lookup request "upstream" to another DNS server until an ADNS server is located (e.g., an exfiltration collector server) to determine whether the DNS query is associated with the data exfiltration activity, step 3 may be performed. Step 3 may include the LDSN server 504 may engage an upstream DNS server, such as DNS server 510, which may be indicated by the internet service provided (ISP). In Step 3, the ISP DNS server 510 may perform the recursive DNS lookup request "upstream" to another DNS server until reaching the ADNS server, which may be an exfiltration collector. The ADNS may return a non-existing domain (e.g. a fake answer "NXDomain") if the DNS query is not to be answered by determining the DNS query is masquerading as an exfiltration attempt. Again, step 4 includes the LDNS sends a response to the user 502 with either the non-existing domain (e.g., NXDomain) or an indication that an answer is not found or located. It should be noted that steps 2 and 3 prevent DNS tunneling data exfiltration by establishing the DNS question is masquerading as an exfiltration attempt. Also, it should be noted that the DNS tunneling detection processor 506 may be collocated within the DNS server 504 or located external or remotely to the DNS server 504.

Figure 6:
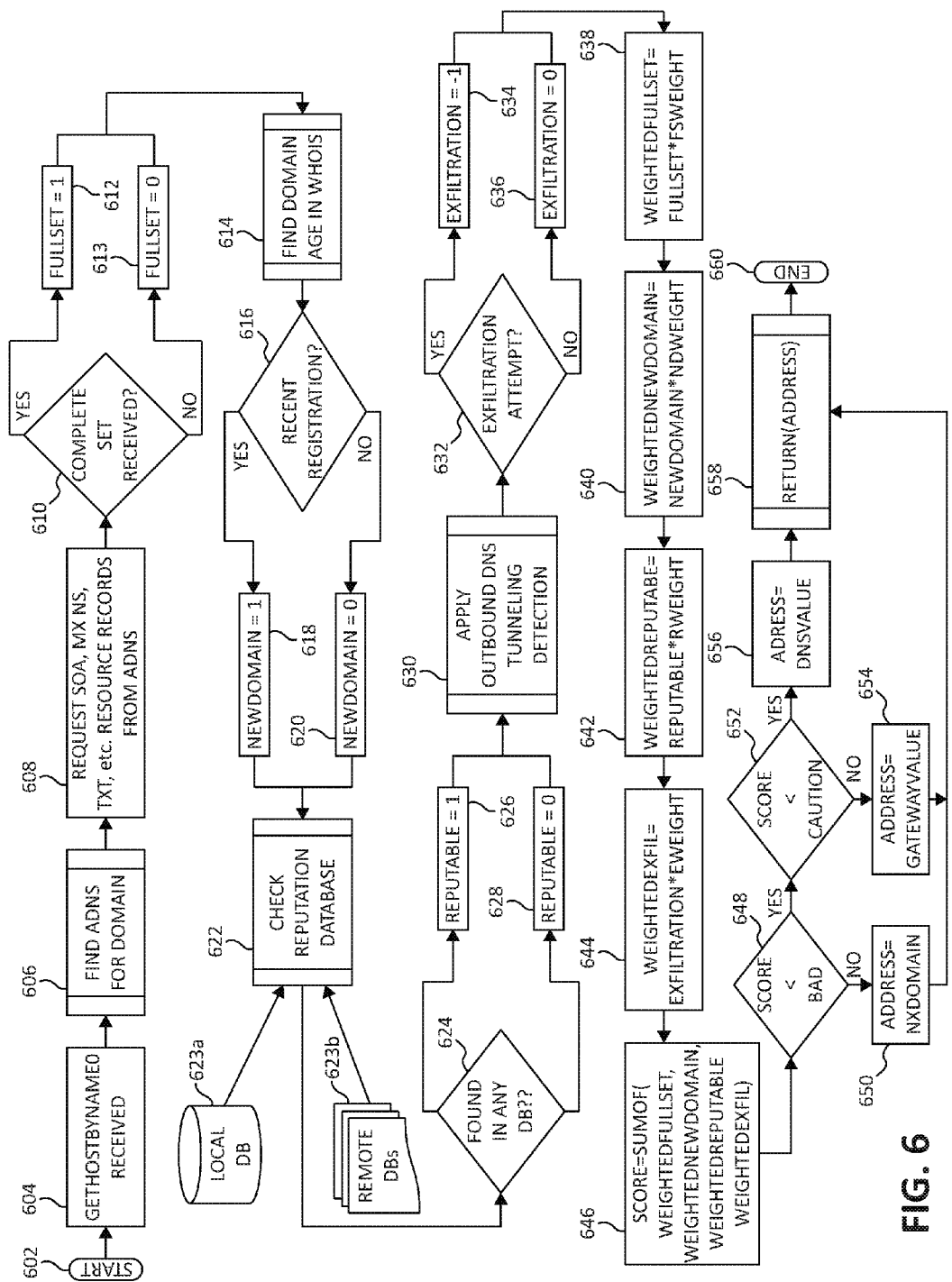
FIG. 6 is a flowchart diagram depicting an exemplary method for DNS tunneling prevention by a processor, in which aspects of the present invention may be realized.

FIG. 6 is a flow chart diagram depicting an exemplary method for preventing DNS tunneling by a processor, in which aspects of the present invention may be realized. The functionality 600 may be implemented as a method executed as instructions on a machine, where the instructions are included on at least one computer readable medium or one non-transitory machine-readable storage medium. In one aspect, the functionality 600 is executed from a perspective of a DNS tunneling detection server. The functionality 600 may start in block 602. A DNS data communication protocol having an API call or resolver function such as, for example, a "gethostbynam( )" message may be received. A search operation is executed to identify an ADNS server for the domain, as in block 606. One or more resource records are requested from the ADNS server, as in block 608. For example, the resource records may include a start of address (SOA) records, a mail exchanger (MX) records, name server (NS) records, text (TXT) records, and the like. Upon receiving the resource records, a determination operation is performed to determine if a complete set or "full set" of resource records are received, as in block 610. If yes at block 610, the set of resource records is assigned a value, such as one "1", as in block 612. If no at block 610, the set of resource records is assigned a value, such as zero "0", as in block 613.

At block 614, a search operation is performed in a domain registry (e.g., "WHOIS") to identify the domain name age. A determination operation is performed to determine if the domain name registration has occurred with a selected time period (e.g., "has the domain registration recently occurred, such as, in the last 30 days"), as in block 616. If yes at block 616, the domain age of the registered domain (e.g., a "new domain" or "recently registered domain") may be assigned a value, such as negative one "−1", as in block 618. If no at block 616, the domain age of the registered domain (e.g., an "old domain" or "non-recent registered domain") may be assigned a value, such as zero "0", as in block 620.

At block 622, a search operation is performed using a reputation database, such as, for example by using a local database 623a or remotely located database 623b, to identify, collect, and/or acquire reputation data of the domain. A determination operation is performed to determine if the domain name has reputation data (e.g., a trust rating) in the reputation database, as in block 624. The reputation data may be reputation data in relation to the domain name itself, URLs (Uniform Resource Locators) associated with the domain name, domain name purchaser or registrant, or email addresses associated with the domain name. The reputation data may be tracked on a person or an entity, a domain name, a URL associated with the domain name, an email address or any combination thereof. The reputation data may include ratings for various categories, such as email practices, website content, privacy policies and practices, fraudulent activities, domain name related complaints, overall reputation, etc. If yes at block 624, the reputable data may be assigned a value, such as one "1", as in block 626. If no at block 624, the reputable data may be assigned a value, such as zero "0", as in 628. The reputation data may also have an original value that may be received calculated from other reputation records using the sum, average, minimum, maximum, or any other formula. The original value received may also be the assigned value for blocks 626 and 628.

At block 630, a DNS tunneling detection operation (e.g., an outbound DNS tunneling detection) may be performed, at block 630. A determination operation is performed to determine if a DNS query for a domain name is associated with data exfiltration activity (e.g., the DNS query is an "exfiltration attempt") according to the DNS tunneling detection operation, as in block 632. If yes at block 632, the DNS query for data exfiltration attempt may be assigned a value, such as negative one "−1", as in block 634. If no at block 632, the DNS query (a DNS query is either not associated with a data exfiltration attempt or it is unknown) may be assigned a value, such as zero "0", as in block 634.

At block 638, a weighted value for the full set of records may be calculated by multiplying the assigned value of the full set of records with a full set of records weight parameter, index value, percentage, or other weighted numerical value. At block 640, a weighted value for the domain age may be calculated by multiplying the assigned value of the domain age with a domain age weight parameter, index value, percentage, or other weighted numerical value. At block 642, a weighted value for the reputation data of the domain may be calculated by multiplying the assigned value of the reputation data of the domain with a reputation weight parameter, index value, percentage, or other weighted numerical value. At block 644, a weighted value for the data exfiltration activity may be calculated by multiplying the assigned value of the data exfiltration activity of the domain with a data exfiltration activity weight parameter, index value, percentage, or other weighted numerical value.

At block 646, a DNS response score may be calculated according to the assigned values for generating a response or answer to the DNS message query. For example, the DNS response score may be a sum of each of the weighted values of the weighted full set of records, the weighted domain age, the weighted reputation data of the domain, and/or the weighted data exfiltration activity. A determination operation is performed to determine if the DNS response score is less than a first level threshold or "bad threshold" (e.g., a threshold indicating the degree for attempting to execute a data exfiltration attempt is greater than defined percentage such as 50 percent), as in block 648. If no at block 648, a non-existing domain (e.g., NXDomain) is provided in the DNS response message to prevent the data exfiltration activity upon the DNS response score being greater than the data exfiltration attack threshold. If yes at block 648, a determination operation is performed to determine if the DNS response score is less than a second level threshold or "cautionary threshold" (e.g., a threshold indicating the degree for attempting to execute a data exfiltration attempt is less than a defined percentage such as 50 percent), as in block 652. If no at block 652, a DNS server address (e.g., a gateway value or address to a DNS server) may be provided in the DNS response upon the DNS response score being less than the data exfiltration attack/caution threshold, as in block 654. If yes at block 652, provide the address or DNS value to the DNS query, as in block 656. The DNS response is returned, as in block 658. The functionality 600 may end, as in block 660.

Figure 7:
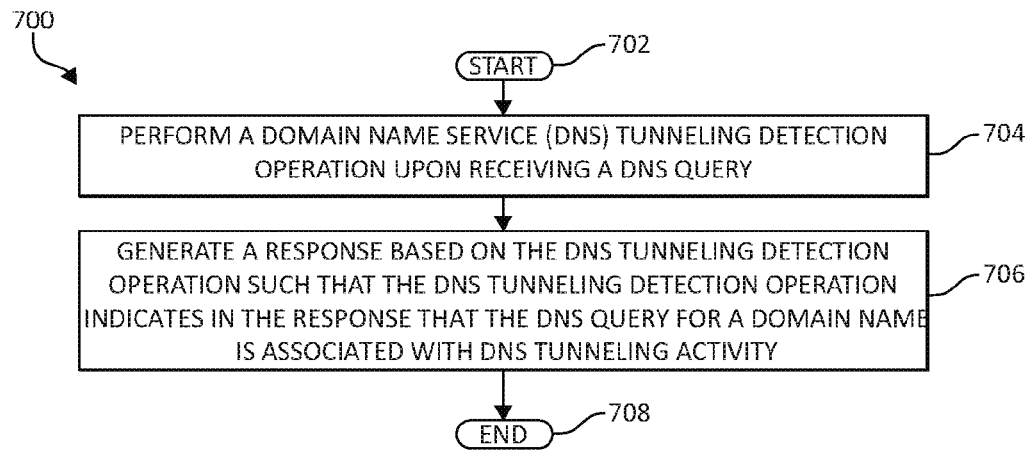
FIG. 7 is an additional flowchart diagram depicting an additional exemplary method for preventing DNS tunneling prevention by a processor, again in which aspects of the present invention may be realized.

Turning now to FIG. 7, a method 700 for preventing DNS tunneling by a processor is depicted, in which various aspects of the illustrated embodiments may be implemented. That is, FIG. 7 is a flowchart of an additional example method 700 for enforced registry of cookies in tiered delivery network of a computing environment according to an example of the present technology. The functionality 700 may be implemented as a method executed as instructions on a machine, where the instructions are included on at least one computer readable medium or one non-transitory machine-readable storage medium. Starting in block 710, a DNS tunneling detection operation may be performed upon receiving a DNS query. For example, the DNS tunneling detection operation may be performed (or requested to be performed (or requested to be performed, such as, for example, performed by a DNS tunneling detection processor) a DNS tunneling detection processor) upon receipt of a request to determine the DNS query is associated with DNS tunneling activity (e.g., data exfiltration activity). A response is generated based on the DNS tunneling detection operation such that the DNS tunneling detection operation indicates in the response that the DNS query for a domain name is associated with DNS tunneling activity, as in block 720.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method, by a processor, for domain name service (DNS) tunneling prevention, comprising:
    requesting a domain name service (DNS) tunneling detection operation upon receiving a DNS query;
    generating a response based on the DNS tunneling detection operation such that the DNS tunneling detection operation indicates in the response that the DNS query for a domain name is associated with DNS tunneling activity;
    assigning a value to each one of a plurality of factors, wherein the plurality of factors include an age of a domain name, a set of resource records, reputation data of the domain name, and detection of DNS tunneling activity using DNS tunneling;
    calculating a DNS response score according to the assigned values for generating the response;
    comparing the DNS response score to a first level threshold; and
    providing a non-existing domain in the DNS response to prevent the DNS tunneling activity upon the DNS response score being greater than the first level threshold.

2. The method of claim 1, further including providing in the response a request to perform a DNS lookup request to determine the DNS query is associated with the DNS tunneling activity.

3. The method of claim 1, further including sending a non-existing domain name in the response to prevent the DNS tunneling according to the response.

4. The method of claim 1, further including:
    comparing the DNS response score to a second level threshold; and
    providing a DNS server address in the DNS response upon the DNS response score being less than the second level threshold.

5. A system for domain name service (DNS) tunneling prevention, comprising:
    one or more computers with executable instructions that when executed cause the system to:
    request a domain name service (DNS) tunneling detection operation upon receiving a DNS query;
    generate a response based on the DNS tunneling detection operation such that the DNS tunneling detection operation indicates in the response that the DNS query for a domain name is associated with DNS tunneling activity;

assign a value to each one of a plurality of factors, wherein the plurality of factors include an age of a domain name, a set of resource records, reputation data of the domain name, and detection of DNS tunneling activity using DNS tunneling;

calculate a DNS response score according to the assigned values for generating the response;

compare the DNS response score to a first level threshold; and provide a non-existing domain in the DNS response to prevent the DNS tunneling activity upon the DNS response score being greater than the first level threshold.

6. The system of claim 5, wherein the executable instructions further provide in the response a request to perform a DNS lookup request to determine the DNS query is associated with the DNS tunneling activity.

7. The system of claim 5, wherein the executable instructions further provide send a non-existing domain name in the response to prevent the DNS tunneling activity according to the response.

8. The system of claim 5, wherein the executable instructions further:

compares the DNS response score to a second level threshold; and provides a DNS server address in the DNS response upon the DNS response score being less than the second level threshold.

9. A computer program product for, by a processor, domain name service (DNS) tunneling prevention, the computer program product comprising a non-transitory computer-readable storage medium having computer-readable program code portions stored therein, the computer-readable program code portions comprising:

an executable portion that requests a domain name service (DNS) tunneling detection operation upon receiving a DNS query;

an executable portion that generates a response based on the DNS tunneling detection operation such that the DNS tunneling detection operation indicates in the response that the DNS query for a domain name is associated with DNS tunneling activity;

an executable portion that assigns a value to each one of a plurality of factors, wherein the plurality of factors include an age of a domain name, a set of resource records, reputation data of the domain name, and detection of DNS tunneling activity using DNS tunneling;

an executable portion that calculates a DNS response score according to the assigned values for generating the response;

an executable portion that compares the DNS response score to a first level threshold; and an executable portion that provides a non-existing domain in the DNS response to prevent the DNS tunneling activity upon the DNS response score being greater than the first level threshold.

10. The computer program product of claim 9, further including an executable portion that provides in the response a request to perform a DNS lookup request to determine the DNS query is associated with the DNS tunneling activity.

11. The computer program product of claim 9, further including an executable portion that sends a non-existing domain name in the response to prevent the DNS tunneling activity according to the response.

12. The computer program product of claim 9, further including an executable portion that:

compares the DNS response score to a second level threshold; and provides a DNS server address in the DNS response upon the DNS response score being less than the second level threshold.

* * * * *